United States Patent
Hall et al.

(10) Patent No.: US 6,294,145 B1
(45) Date of Patent: Sep. 25, 2001

(54) PIRANHA ETCH PREPARATION HAVING LONG SHELF LIFE AND METHOD OF MAKING SAME

(75) Inventors: Lindsey H. Hall, Dallas; Charles R. Schraeder, McKinney; Jennifer A. Sees, The Colony, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/336,352

(22) Filed: Nov. 8, 1994

(51) Int. Cl.$^7$ .................................................. C01B 5/08
(52) U.S. Cl. .................. 423/513; 206/213.1; 206/524.8; 216/93; 216/108
(58) Field of Search ............................. 206/213.1, 524.8; 216/93, 108; 423/513

(56) References Cited

U.S. PATENT DOCUMENTS

| | | | |
|---|---|---|---|
| 2,899,272 | * | 8/1959 | Flach et al. ........................... 423/513 |
| 3,801,512 | * | 4/1974 | Solenberger ......................... 216/108 |
| 3,927,189 | * | 12/1975 | Jayawant ............................... 423/513 |
| 3,931,396 | * | 1/1976 | Bardy et al. ........................ 206/524.8 |
| 4,022,703 | * | 5/1977 | Bakes et al. ........................... 252/79.2 |
| 4,229,544 | * | 10/1980 | Haynes et al. ..................... 206/213.1 |
| 4,334,610 | * | 6/1982 | Ota et al. ........................... 206/213.1 |
| 4,526,650 | * | 7/1985 | Blomquist et al. .................. 216/108 |
| 4,579,725 | * | 4/1986 | Jayawant ............................... 423/513 |
| 4,917,122 | * | 4/1990 | Lapham et al. ...................... 423/513 |
| 5,304,360 | * | 4/1994 | Lane et al. ........................... 423/521 |

* cited by examiner

Primary Examiner—T. Tung
(74) Attorney, Agent, or Firm—W. James Brady, III; Frederick J. Telecky, Jr.

(57) ABSTRACT

A method of formulating a strong oxidizing solution comprising formulating a strong oxidizing solution having from about 2 to about 5 percent PDSA with concentrated sulfuric acid in the ratio of from about 1:8 to about 1:20 parts by volume and storing the strong oxidizing solution in a container having a space over the solution containing one of a vacuum or a non-oxidizing atmosphere inert to the oxidizing solution. The amount of PDSA is preferably about 4 percent by volume and the ratio is preferably about 1:10 parts by volume. The space over the strong oxidizing solution is preferably a vacuum or substantially all nitrogen. Hydrogen peroxide can be substituted for the PDSA in which case the method comprises formulating a strong oxidizing solution having from about 40 to about 60 percent hydrogen peroxide with concentrated sulfuric acid in the ratio of from about 1:8 to about 1:20 parts by volume and storing the strong oxidizing solution in a container having a space over the solution containing one of a vacuum or a non-oxidizing atmosphere inert to the oxidizing solution.

8 Claims, No Drawings

PIRANHA ETCH PREPARATION HAVING LONG SHELF LIFE AND METHOD OF MAKING SAME

BACKGROUND OF THE INVENTION

1. Field of the Invention

This invention relates to a method of providing a strong oxidizing solution containing sulfuric acid and peroxydisulfuric acid or $H_2S_2O_8$ (PDSA) having relatively long shelf life and to the stored strong oxidizing solution.

2. Brief Description of the Prior Art

Caro's acid ($H_2SO_5$) is a powerful oxidizing agent used in preparation of standard piranha etch solutions for use in semiconductor fabrication technologies. The piranha etch solution (Caro's acid) is generally used to remove photoresist from semiconductor devices being fabricated. Pirhana etch solution generally contains from about 4 to about 5 parts by volume concentrated $H_2SO_4$ to one part by volume hydrogen peroxide. Caro's acid can be formed by mixing sulfuric acid ($H_2SO_4$) and hydrogen peroxide ($H_2O_2$) in a reversible reaction which yields the Caro's acid and water. In the required ratios, this reaction is exothermic, raising the temperature of the bath from ambient to about 110° to about 130° C. Caro's acid formulated in this manner is also relatively unstable and has therefore presented storage problems. In general, when Caro's acid has been required, it has been formulated and used immediately after formulation.

Oxidizing solutions have also been produced in the prior art by mixing peroxydisulfuric acid or $H_2S_2O_8$ (PDSA) with sulfuric acid. This formulation has also been found to have poor shelf life because, after about 1 week, there was a 50 percent loss of product where a solution of 10 parts by volume concentrated sulfuric acid to one part by volume PDSA was used. Accordingly, this formulation has only been prepared and applied at the time and point of use.

The economics of piranha solution formulation would be materially improved if the strong oxidizing solution required could be an off-the-shelf item with materially extended shelf life by storage at the point of use rather than having to be formulated separately in conjunction with each use. Not only is the cost of preparation of strong oxidizing solution high but the cost of delivery in a pipeline is also quite high.

SUMMARY OF THE INVENTION

In accordance with the present invention, strong oxidizing solution has been formulated and stored with a shelf life in excess of one week. Briefly, this has been accomplished by providing such strong oxidizing solution, preferably by mixing peroxydisulfuric acid having a concentration of from about 2 to about 5 percent and preferably about 4 percent with concentrated sulfuric acid in the ratio of from about 1:8 to about 1:20 parts by volume and preferably 1:10 parts by volume. The acid is then placed in a container which is inert to the chemicals involved, preferably one having high purity and low contamination and of polytetrafluoroethylene (PTFE) or polyfluoroalkoxy (PFA) having an atmosphere which is non-oxidizing and inert to the oxidizing solution or has an evacuated region above the acid. The container can then be transported to the point of use and retained at that location for extended periods in excess of one week. While concentrated sulfuric acid and PDSA of from 2 to 5 percent is preferred in the ratios stated above, it is readily apparent that other ratios will be used if less concentrated sulfuric acid is used and/or if PDSA which is more or less concentrated than 4 percent is used.

The same result with respect to shelf life should be available when formulating a mixture of hydrogen peroxide having a concentration of from about 40 percent to about 60 percent and preferably 50 percent with concentrated sulfuric acid having a ratio of from about 1:8 to about 1:20 parts by volume and preferably 1:11 parts by volume.

The strong oxidizing solution can be used as a cleaning solution after diluting said solution with water.

DESCRIPTION OF THE PREFERRED EMBODIMENT

EXAMPLE 1

A 4 percent solution of peroxydisulfuric acid was mixed with a concentrated solution of sulfuric acid in the ratio of 1 part by volume PDSA to ten parts of sulfuric acid. The solution was mixed in a container chemically inert to the chemicals involved, preferably of PFA, to provide a homogeneous mixture and the mixture was immediately stoppered and stored in that container. The ambient gas in the container over the mixture was then removed to the extent possible to provide an evacuated region over the mixture. The container with the mixture was then placed on a shelf at room temperature and tested after one week. The mixture was found to contain 98 percent of its original oxidizing capacity.

EXAMPLE 2

Example 1 was repeated except that nitrogen was passed into the container to replace the ambient air therein. After one week the mixture contained 98 percent of its original oxidizing capacity.

EXAMPLE 3

A solution of hydrogen peroxide was mixed with a concentrated solution of sulfuric acid in the ratio of 1 part by volume of 50 percent hydrogen peroxide to 11 parts of sulfuric acid. The solution was mixed in a container chemically inert to the chemicals involved, preferably of PFA, to provide a homogeneous mixture and the mixture was immediately stoppered and stored in that container. The ambient gas in the container over the mixture was then removed to the extent possible to provide an evacuated region over the mixture. The container with the mixture was then placed on a shelf at room temperature and tested after one week. The mixture was found to contain 98 percent of its original oxidizing capacity.

EXAMPLE 4

Example 3 was repeated except that nitrogen was passed into the container to replace the ambient air therein. After one week the mixture contained 98 percent of its original oxidizing capacity.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A method of formulating a strong oxidizing solution of Caro's acid which comprises the steps of:

(a) formulating a strong oxidizing solution of Caro's acid by mixing about 2 to 5 percent PDSA by volume with concentrated sulfuric acid in the radio of about 1 part PDSA: 8 parts sulfuric acid by volume to about 1 part PDSA: 20 parts sulfuric acid by volume; and (b) storing said strong oxidizing solution in a container having a space over said solution containing one of a vacuum or a non-oxidizing atmosphere inert to said oxidizing solution.

2. The method of claim 1 wherein said PDSA is about 4 percent by volume and said ratio is about 1 part PDSA: 10 parts sulfuric acid by volume.

3. The method of claim 2 wherein said space over said strong oxidizing solution is substantially all nitrogen.

4. The method of claim 1 wherein said space over said strong oxidizing solution is substantially all nitrogen.

5. A method of formulating a strong oxidizing solution of Caro's acid which comprises the steps of:

(a) formulating a strong oxidizing solution of Caro's acid by mixing about 40 to 60 percent hydrogen peroxide by volume with concentrated sulfuric acid in the ratio of about 1 part hydrogen peroxide: 8 parts sulfuric acid by volume to about 1 part hydrogen peroxide: 20 parts sulfuric acid by volume; and (b) storing said strong oxidizing solution in a container having a space over said solution containing one of a vacuum or a non-oxidizing atmosphere inert to said oxidizing solution.

6. The method of claim 5 wherein said hydrogen peroxide is about 50 percent by volume and said ratio is about 1 part hydrogen peroxide: 11 parts sulfuric acid by volume.

7. The method of claim 6 wherein said space over said strong oxidizing solution is substantially all nitrogen.

8. The method of claim 5 wherein said space over said strong oxidizing solution is substantially all nitrogen.

* * * * *